United States Patent [19]

Paull

[11] Patent Number: 5,494,386
[45] Date of Patent: Feb. 27, 1996

[54] APPARATUS FOR RETAINING A LOAD IN A VEHICLE

[75] Inventor: Michael J. Paull, 18 Bottega Place, Lesmurdie, Western Australia, Australia, 6076

[73] Assignees: Michael John Paull; Keith Paull; Gregory Keith Paull; Neville Paull; Stephen Murray Paull, Australia

[21] Appl. No.: 147,583

[22] Filed: Nov. 5, 1993

[51] Int. Cl.⁶ .......................................... B60P 7/08
[52] U.S. Cl. .................... 410/77; 410/3; 410/7; 410/66; 296/20
[58] Field of Search .................. 410/2, 3, 4, 7, 410/19, 51, 66, 67, 77, 9; 296/20; 248/503, 503.1

[56] References Cited

U.S. PATENT DOCUMENTS

| | | | |
|---|---|---|---|
| 3,984,111 | 10/1976 | Bates et al. | 410/66 |
| 4,062,209 | 12/1977 | Downing et al. | 410/3 X |
| 4,407,616 | 10/1983 | Hinze | 410/3 |
| 5,092,722 | 3/1992 | Reazer, III et al. | 296/20 X |
| 5,186,585 | 2/1993 | Sousa et al. | 410/9 |
| 5,205,601 | 4/1993 | Ferris | 410/7 X |

Primary Examiner—Michael S. Huppert
Assistant Examiner—Stephen Gordon
Attorney, Agent, or Firm—Kerkam, Stowell, Kondracki & Clarke; Dennis P. Clarke

[57] ABSTRACT

An apparatus (10) for retaining a load having load engaging members (12) to engage the load (100) to be retained along with movement limiting members (14,16) and contact members (18). The load engaging members (12) are movable between first and second positions. The contact members (18) contact the movement limiting members (14,16) so that the load engaging members (12) are fixable in the first and second positions.

17 Claims, 8 Drawing Sheets

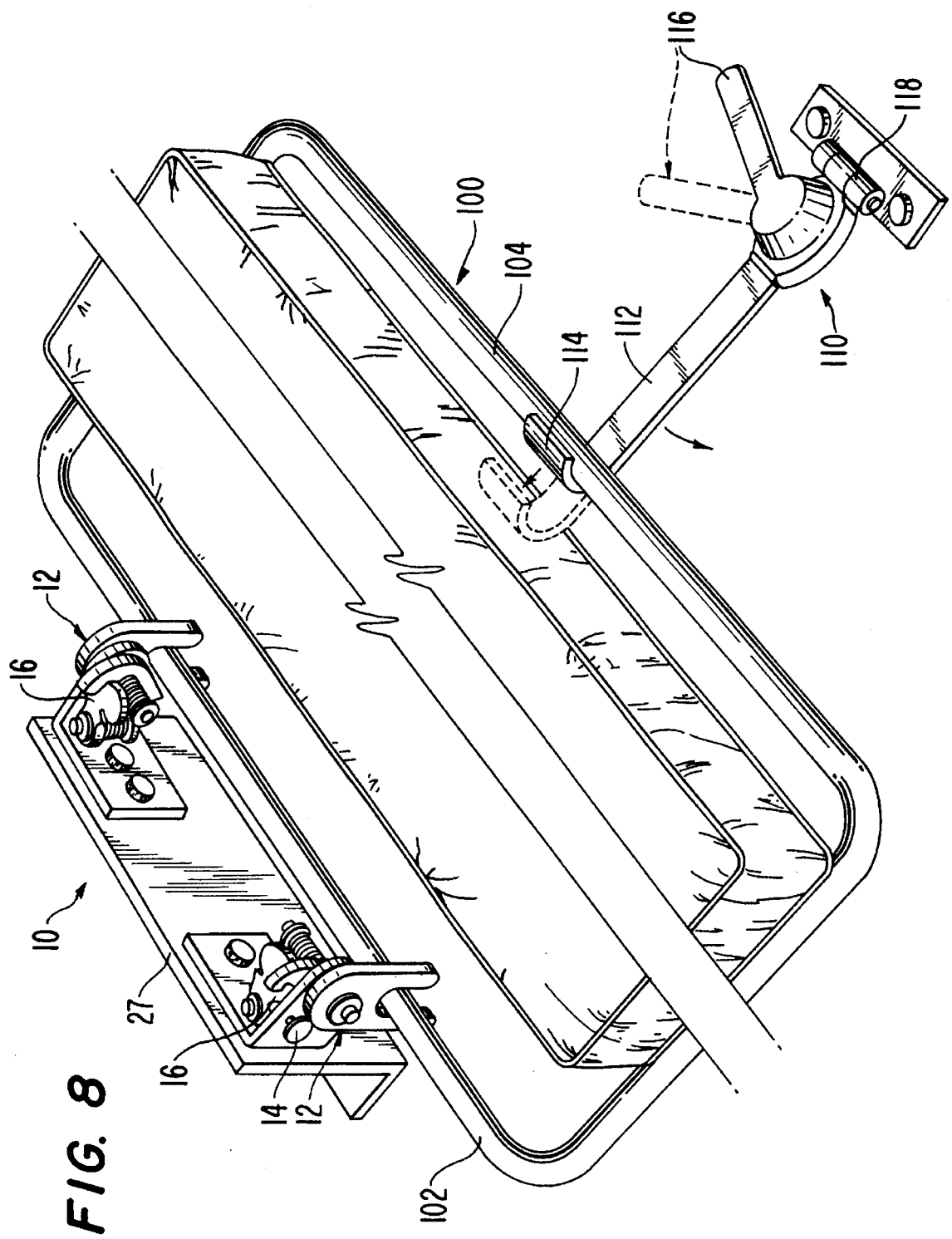

1
APPARATUS FOR RETAINING A LOAD IN A VEHICLE

FIELD OF THE INVENTION

The present invention relates to an apparatus for retaining a load in a vehicle.

BACKGROUND OF THE INVENTION

Loads in a vehicle are susceptible to movement due to the motions of the vehicle. This is particularly the case with mobile loads.

SUMMARY OF THE INVENTION

The present invention seeks to retain loads in vehicles. In accordance with one aspect of the present invention there is provided an apparatus for retaining a load in a vehicle comprising:
- load engaging means movable in first and second directions and biased in said first direction, said load engaging means fixable in at least first and second positions, said first position arranged to receive said load and said second position arranged to retain said load; movement limiting means; and,
- first contact means to contact said movement limiting means, wherein said load engaging means is movable between said first and second positions and said contact means contacts said movement limiting means such that said load engaging means is fixable in said first and second positions.

BRIEF DESCRIPTION OF THE DRAWINGS

The present invention will now be described, by way of example, with reference to the accompanying drawings, in which:

FIG. 8 is a perspective view of the apparatus shown in FIG. 1 in use to retain a load in a vehicle.

Figure 1:
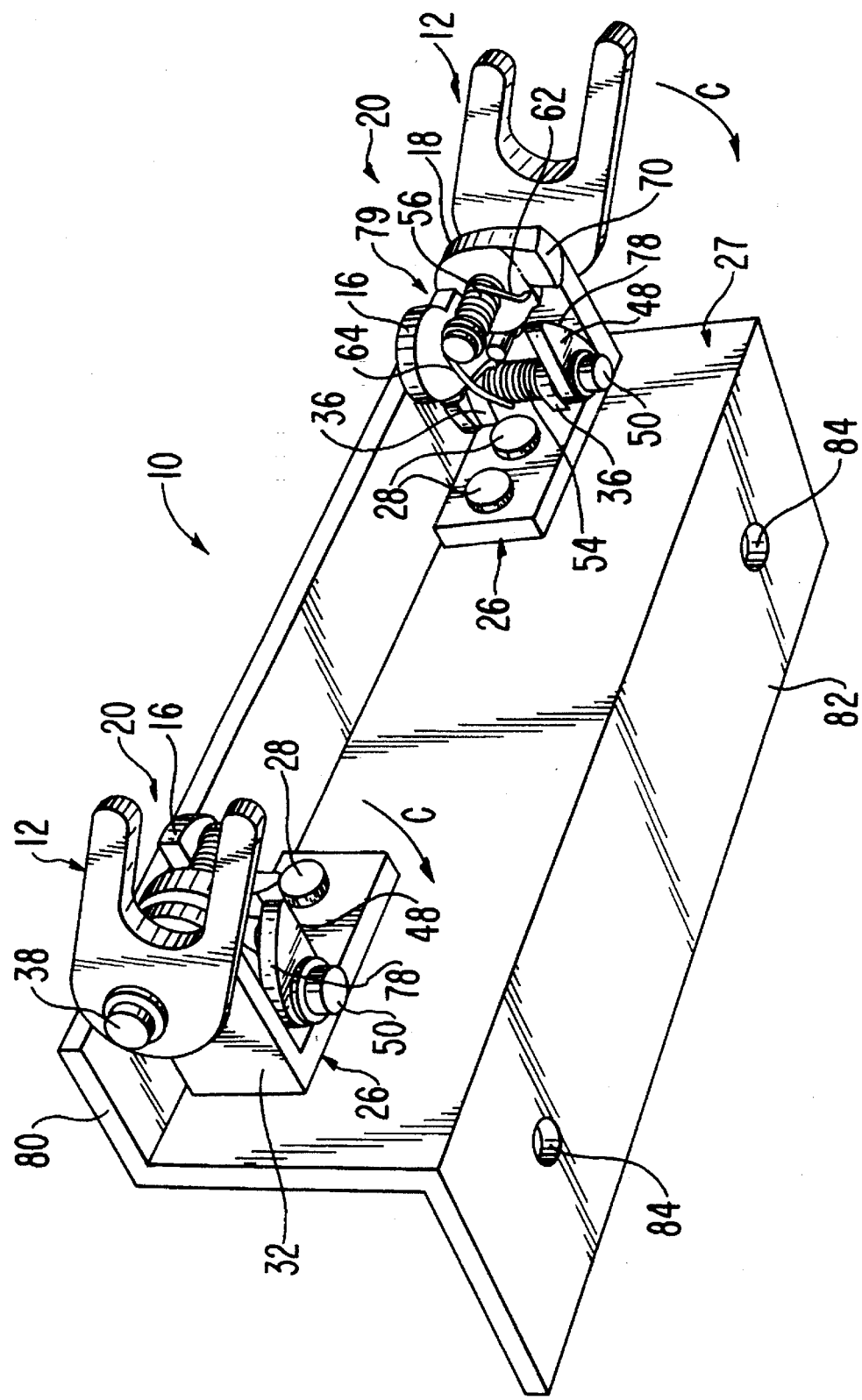
FIG. 1 is a lower perspective view of an embodiment of an apparatus for retaining a load in a vehicle in accordance with the present invention.

In the drawings, there is shown an apparatus 10 for retaining a load in a vehicle.

2
DETAILED DESCRIPTION OF THE INVENTION

The apparatus 10 comprises load engaging members 12 movable in first and second directions, movement limiting members 14 and 16 and first contact members 18.

The load engaging members 12, movement limiting members 14 and 16 and the first contact members 18 form part of respective load retaining and releasing mechanisms 20. The apparatus 10 shown in the drawings has two such load retaining and releasing mechanisms 20. These are a left side mechanism 20 and a right side mechanism 20. These left and right side mechanisms 20 are identical in structure but are of opposite hand.

The right side mechanism 20 is shown in exploded view in FIG. 4, and will now be described.

The load engaging member 12 is non-rotatably mounted on a pin 21.

The load engaging member 12 is provided with an aperture 22 and is thereby mounted on the pin 21.

The aperture 22 may be of square section and the pin 21 may have a corresponding square sectional portion 23a which locates in the aperture 22 such that the load engaging member 12 is non-rotatably mounted on the pin 21. The pin 21 has a middle portion of circular section which is rotatably positioned in a (circular) aperture 24 provided in a bracket 26.

The bracket 26 is itself connected to a mounting and support plate 27 (best seen in FIG. 1) of the apparatus 10. This is effected by way of bolts 28 passing through apertures 30 in the bracket 26 and extending into the mounting and support plate 27.

The bracket 26 is L-shaped and comprises a lug portion 32 extending therefrom. It is the lug portion 32 which has the aperture 24 therein.

The lug portion 32 also has a curved slot aperture 34 therein.

A pair of small plates 36, having apertures 37 therein, are connected to the inside corner of the bracket 26.

The first contact member 18 is non-rotatably mounted on the pin 21.

The first contact member 18 is provided with an aperture 38 and is thereby mounted on the pin 21.

The aperture 38 may be of square section and the pin 21 may have a corresponding square sectioned portion 23b which locates in the aperture 38 such that the first contact member 18 is non-rotatably mounted on the pin 21.

Accordingly, the pin 21 extends through the aperture 24 and the load engaging member is positioned on one side of the lug 32 and the first contact member 18 is positioned on the other side.

A nut 39 and washer 40 are provided on the threaded end 41 of the pin 21 to ensure that the load engaging member 12 is retained thereon.

The movement limiting member 14 extends through the curved slot aperture 34 such that it is retained therein and movable along the arc of the curved slot aperture 34.

A spring (not shown) may be provided to bias the movement limiting member 14 in the upward forward direction of the curved slot aperture 34, viz. in the general direction toward the aperture 24.

The movement limiting member 14 is of substantially pin form.

The movement limiting member 16 is non-rotatably mounted on a pin 42.

The movement limiting member 16 is provided with an aperture 43 and is thereby mounted on the pin 42.

The aperture 43 may be of square section and the pin 42 may have a corresponding square sectioned portion 44a which locates in the aperture 43 such that the movement limiting member 16 is non-rotatably mounted on the pin 42.

The pin 42 has a middle portion of circular section such that it is rotatably positioned in the (circular) apertures 37 of the small plates 36.

The movement limiting member 16 is positioned between the upper small plate 36 and a nut 45 and a washer 46, which are provided on the threaded end 47a of the pin 42 to ensure that the movement limiting member 16 is retained on the pin 42.

A second contact member 48 is non-rotatably mounted on the pin 42 near the other end thereof, on the other side of the circular sectioned middle portion of the pin 42.

The second contact member 48 is provided with an aperture 49 and is thereby mounted on the pin 42.

The aperture 49 may be of square section and the pin 42 may have a corresponding square sectioned portion 44b which locates in the aperture 49 such that the second contact member 48 is non-rotatably mounted on the pin 42.

The second contact member 48 is positioned between the lower small plate 36 and a nut 50 and washer 52 which are provided on the threaded end 47b of the pin 42 to retain the second contact member 48 on the pin 42.

Thus, the pin 42 is rotatably retained in the apertures 37 of the small plates 36.

The movement limiting member 16 and the second contact member 48 are thus fixedly mounted on the pin 42 such that they rotate with the pin 42.

Similarly, the load engaging member 12 and the first contact member 18 are fixedly mounted on the pin 21 such that they rotate with the pin 21.

A spring 54 biases the movement limiting member 16 against the first contact member 18 in the direction toward the lug 32. As a result, the pin 42 and the second contact member 48 and also biased in this direction. The spring 54 is coiled around the middle portion of the pin 42 which is of circular section (i.e. the portion between the square sectioned portions 44a and 44b). The spring 54 has a portion 55 which extends therefrom and engages with the movement limiting member 16. The spring 54 has another portion (obscured in the drawings) which extends therefrom and engages against the bracket 26. In this way, the movement limiting member 16 is biased in the direction shown by the arrow A in FIG. 4.

Figure 4:
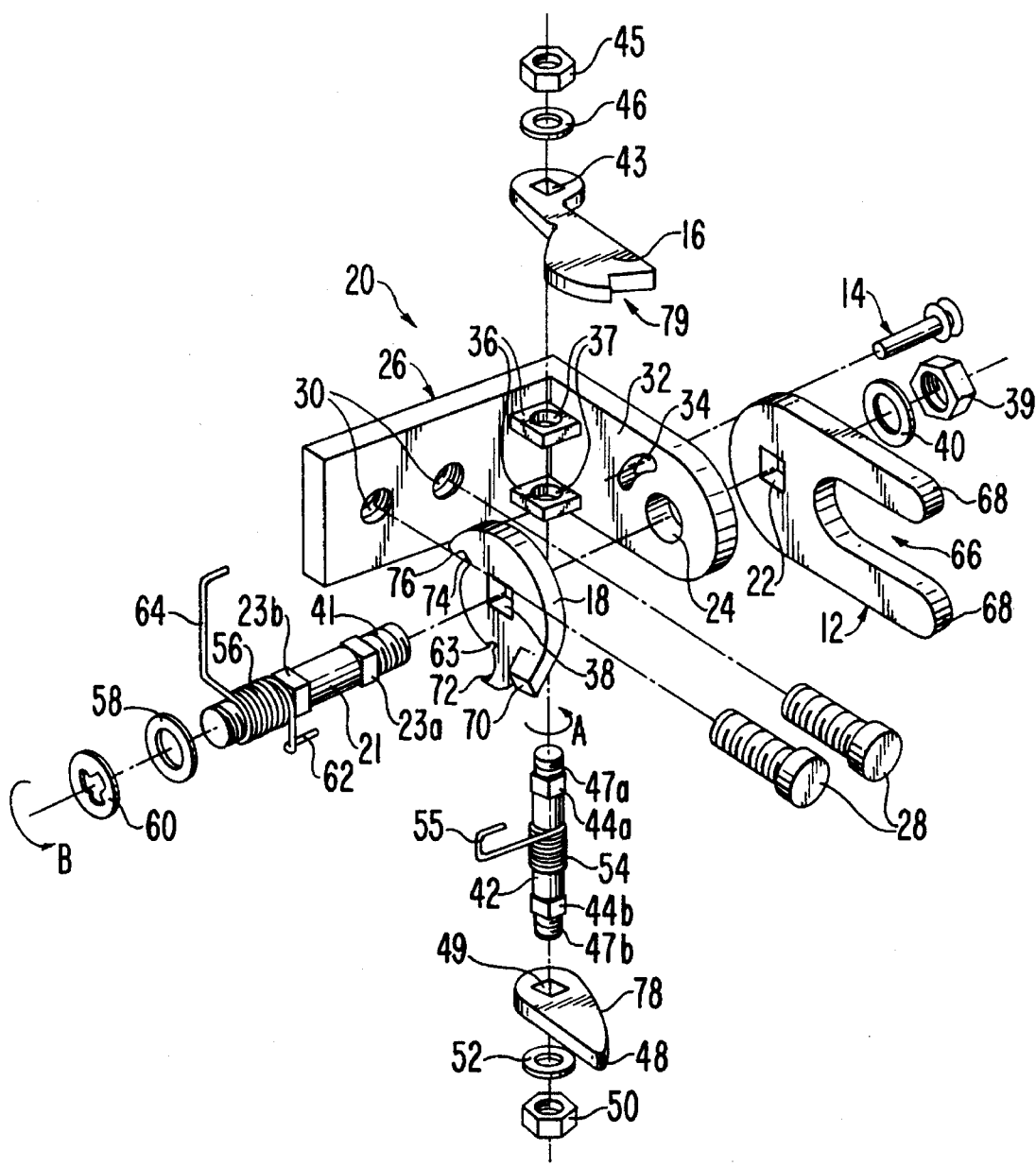
FIG. 4 is an exploded perspective view of the right side load retaining and releasing mechanism of the apparatus shown in FIG. 1.

A second spring 56 is provided to bias the first contact member 18 in a direction of rotation shown by the arrow B in FIG. 4. In this way, the load engaging member 12 is also biased in a first direction corresponding to the direction shown by the arrow B in FIG. 4. Additionally, the pin 21 is also thereby biased in the direction of arrow B. The spring 56 is coiled around a portion of the pin 21 which is between an end thereof and the square sectioned portion 23b.

A washer 58 and retainer clip 60 are provided at the end of the pin 21 to retain the spring 56 thereon. The spring 56 has a portion 62 which extends therefrom and engages in a hole 63 in the first contact member 18. The spring 56 has another portion 64 which extends therefrom and contacts the undersurface of the upper small plate 36. In this way, the above-described biasing action in the direction B is effected.

The pins 21 and 42 are positioned at substantially a right angle relative to each other.

The load engaging member 12 is provided with a recess 66 positioned between two finger-like members 68. A portion of a load to be retained is able to be received in the recess 66 between the finger-like members 68.

The first contact member 18 has a cam-like surface 70 at the lower end thereof. At the end of the cam-like surface 70 there is provided a surface 72. The first contact member 18 is further provided with a recess formation 74 and a circumferential projecting portion 76.

The second contact member 48 is provided with a curved surface 78 which is arranged to contact the cam-like surface 70 of the contact member 18.

The movement limiting member 16 is provided with a cut away portion 79 at its distal part on the side nearest the first contact member 18.

The left side load retaining and releasing mechanism 20 is of the same structure as the right side mechanism 20 which has been hereinbefore described, except that for the left side, mechanism 20, some of the components will be of opposite hand and some others will be inverted. For example, in relation to the principal components, the first contact member 18, the second contact member 48 and the springs 54 and 56 will be of opposite hand, and the movement limiting member 14 will be simply inverted, whilst the load engaging member 12, movement limiting member 16 and pins 21 and 42 are the same.

As previously described, the mechanisms 20 are mounted on a mounting and support plate 27. The mounting and support plate 27 has an upper cover plate portion 80 and a lower mounting plate portion 82. The lower mounting plate portion 82 is provided with apertures 84 therein so that the apparatus 10 can be affixed to a support surface. The manner of operation and use of the apparatus 10 of the present invention will now be described.

The load retaining and releasing mechanisms 20 permit the load engaging members 12 to move between first and second positions.

The first position is shown in FIGS. 1, 2 and 5a–5c, and the second position is shown in FIGS. 3 and 6a–6c. In the first position, the load engaging members 12 extend in a direction substantially outwardly from the mounting and support plate 27 whilst in the second position, the load engaging members extend substantially downwardly.

In use, the apparatus 10 of the present invention is affixed to a support surface (not shown) by way of bolts (not shown) passing through the apertures 84 in the lower mounting plate portion 82 and into the support surface. Generally, the apparatus 10 is affixed in this way to the floor or rear tray in a vehicle. Typically, the vehicle may be an ambulance. The apparatus 10 may be affixed to the floor or rear tray of the vehicle at the forward end of the rear cabin compartment with the apparatus 10 arranged such that the mechanisms 20 face toward the rear of the vehicle.

Figure 5A:
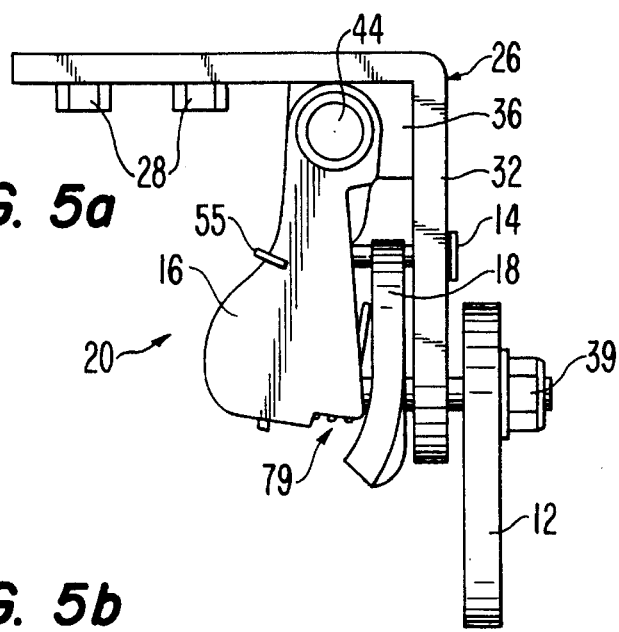
FIGS. 5a, 5b and 5c are an upper plan view, a front elevation view and a lower plan view, respectively, of the right side load retaining and releasing mechanism of the apparatus shown in FIG. 1 in a first condition.

When the load engaging members 12 are in the first position, they are able to receive a load to be retained. In the first position of the load engaging members 12, the circumferential projecting portions 76 of the first contact members 18 bear against the respective movement limiting members 14 due to the biasing action of the springs 56 in the direction shown by arrow B in FIG. 4. This is best seen in FIGS. 5a and 5c. This biasing action causes the circumferential projecting portions 76 to push against the movement limiting members 14 and retain them at the lower end of the curved slot apertures 34. In turn, the movement limiting members 14 in this position prevent any further movement of the first contact members 18 under the biasing action of the springs 56 which means that the pin 21 is also stopped, i.e. it cannot rotate in the aperture 24. Since the first contact members 18 and the load engaging members 12 are fixedly secured to the pins 21, the load engaging members 12 remain in the first position as seen in FIGS. 1, 2 and 5a to 5c.

Figure 2:
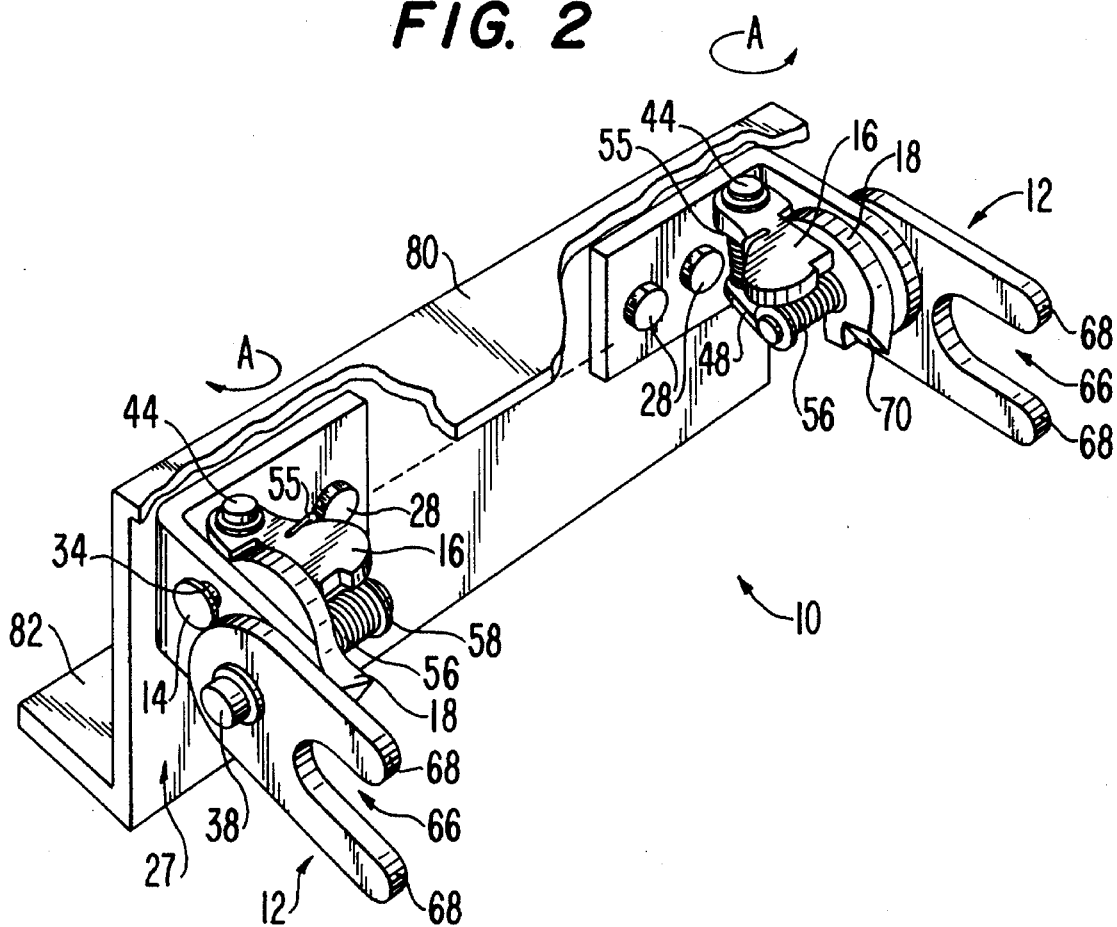
FIG. 2 is an upper perspective view of the apparatus shown in FIG. 1 with portions of the upper cover plate cut away.
Figure 3:
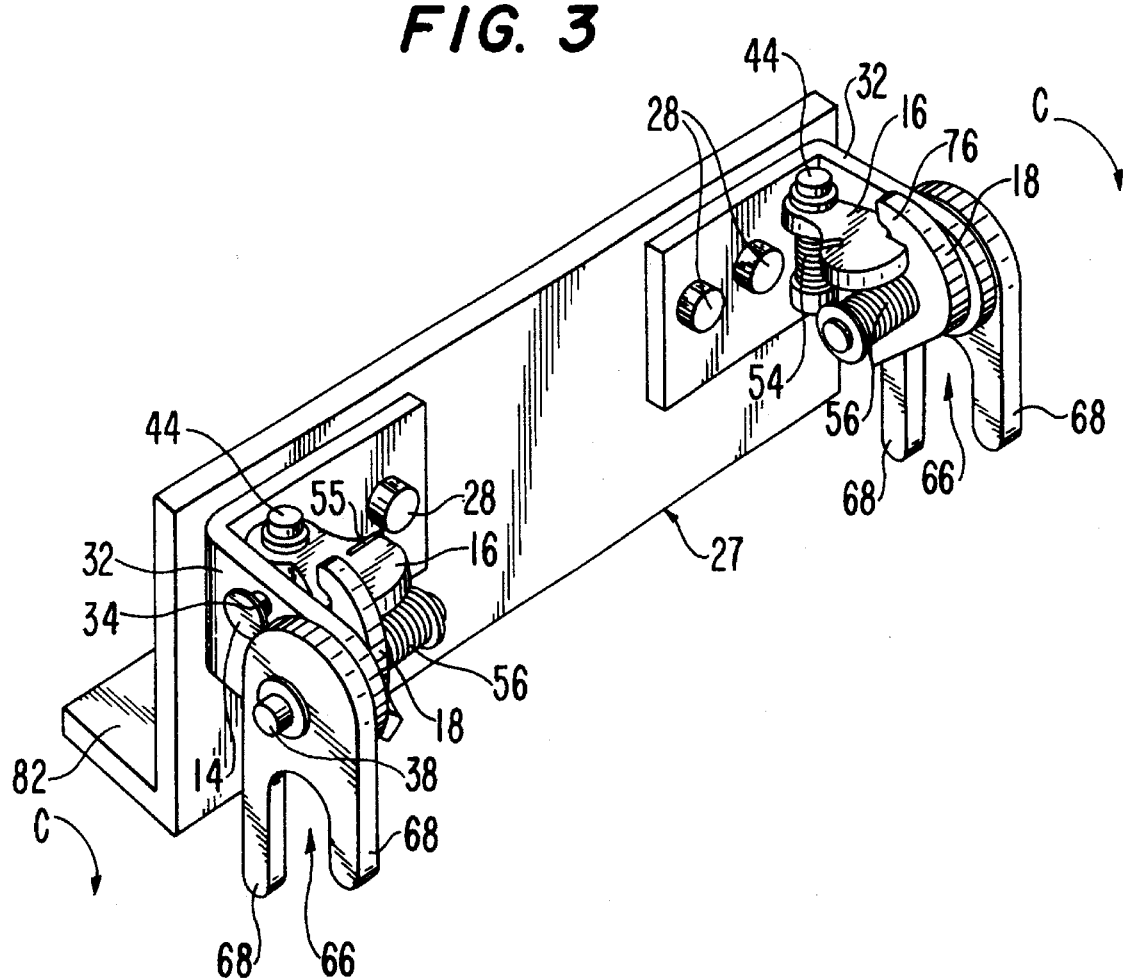
FIG. 3 is a second upper perspective view of the apparatus shown in FIG. 1 with the upper plate omitted for clarity.
Figure 5B:
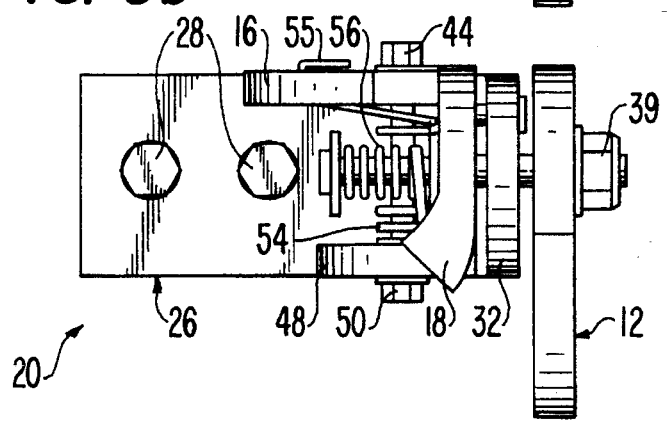
Figure 5C:
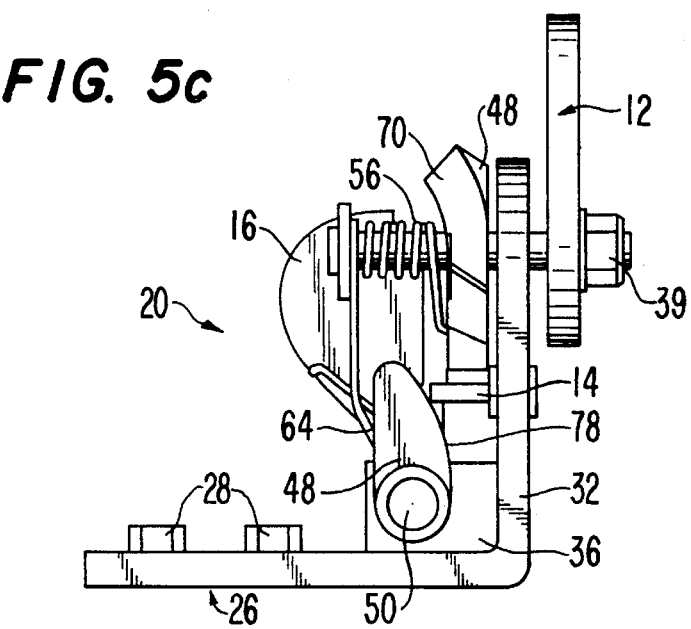
Figure 6A:
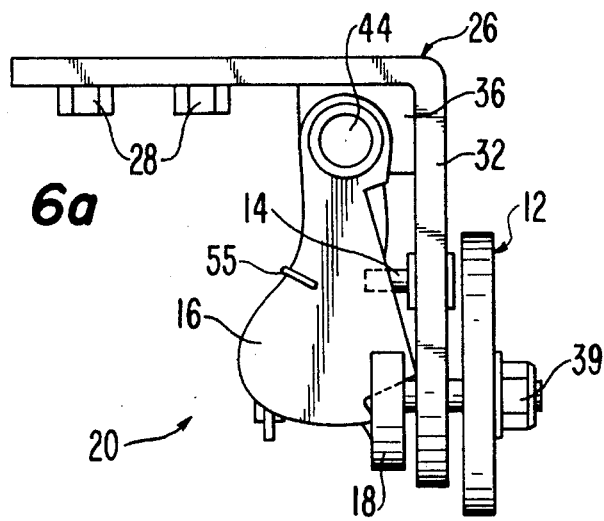
FIGS. 6a, 6b and 6c are an upper plan view, a front elevation view and a lower plan view, respectively, of the right side load retaining and releasing mechanism of the apparatus shown in FIG. 1 in a second condition.
Figure 6B:
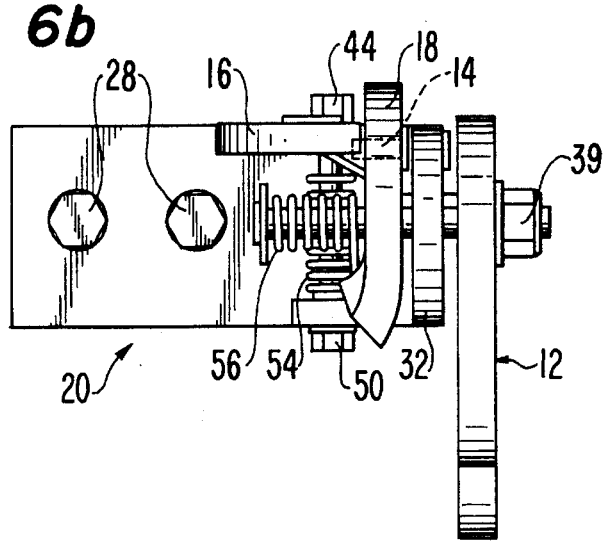
Figure 6C:
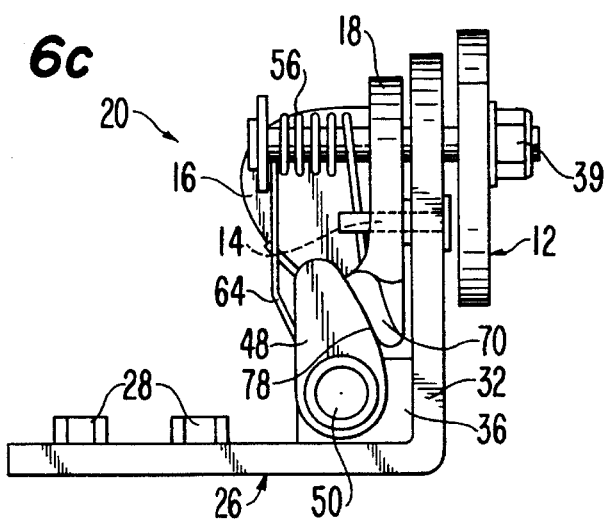

The springs 54 bias the movement limiting members 16 against the respective side surfaces of the first contact members 18, as best seen in FIGS. 2, 5a and 5b. When in the first position (as hereinabove described) the load engaging members 12 are able to receive a load. In an ambulance, typically the load will be the ambulance stretcher. The ambulance stretcher is first loaded into the rear cabin of the ambulance and pushed forwardly until a frame portion 102 of the stretcher 100, shown in FIG. 8, engages in the recesses 66 of the load engaging members 12. In FIG. 8, the stretcher 100 has been truncated in its longitudinal dimension so that the apparatus of the present invention can be shown on a size scale permitting sufficient visual clarity. The stretcher 100 is then continued to be pushed forwardly. This causes the frame portion 102 to be bear against the rear finger-like members 68 of the load engaging members 12 and in turn causes the load engaging members 12, along with the pins 21 and first contact members 18 to move in a first direction shown by arrow C in FIG. 1. This movement continues until the recess formations 74 of the first contact members 18 reach the edge of the cut away portions 79 of the movement limiting members 16. At this point, the springs 54 bias the movement limiting members 16 (along with the pins 42 and the second contact members 48) in the directions A shown in FIG. 2, and the surfaces of the cut away portions 79 slide into abutment with the respective recess formations 74 of the first contact members 18. This abutment of the cut away portions 79 of the movement limiting members 16 and the recess formations 74 of the first contact members 18 prevents further movement of the pins 21 under the biasing action of the springs 56. Thus, the load engaging members 12 remain in a fixed position. This can be seen in FIG. 3 and in FIG. 6a. In this position, the load engaging members 12 are fixed in their second position in which they extend substantially downwardly. This is best seen in FIGS. 3 and 6b. The cut away portions 79 also have surfaces which abut with the sides of the first contact members 18. This is best seen in FIGS. 3, 6a, 6b and 6c. In this second position of the load engaging members 12, the frame portion 102, of the stretcher 100 is positioned between the finger-like members 68 of the load engaging members 12. In this way, the stretcher 100 is retained in position.

When it is desired to release the stretcher 100 from the apparatus 10, the following procedure is followed. The stretcher 100 is pushed forward. This causes the load engaging members 12 to move in the first direction as shown by the arrows C in FIG. 3, toward the support plate 27. The pins 21 along with the first contact members 18 move in a corresponding direction. This movement of the first contact members 18 results in the cam-like surfaces 70 of the first contact members 18 bearing against the curved surfaces 78 of the second contact members 48. Since the second contact members 48 and the movement limiting members 16 are rigidly fixed relative to the pins 42, this abutment of the cam like surfaces 70 with the respective curved surface 78 causes the pins 42 to move in the direction counter to the arrows A shown in FIG. 2. This results in the movement limiting members 16 moving away from the first contact members 18 and lugs 32 against the biasing action of the springs 56 such that the cut away portions 79 of the movement limiting members 16 move out of engagement with the recess formations 74 of the first contact members 18. At the same time, the first contact members 18 move away (in the direction of the arrows C in FIG. 3) from the movement limiting members 16 so that the recess formations 74 move out of contact with the cut away portions 79 of the movement limiting members 16.

The movement of the first contact members 18 in the direction shown by the arrows C in FIG. 3 causes the surfaces 72 of the first contact members 18 to push the movement limiting members 14 upwardly in the curved slot apertures 34. Once the movement limiting members 14 have reached the uppermost part of the curved slot apertures 34, they abut with the edges of the curved slot apertures 34 and this prevents any further movement of the first contact members 18 and the pins 21 and load engaging members 12 in the direction of the arrows C shown in FIG. 3. The load engaging members 12 have now reached a third position (i.e. beyond the second position).

Figure 7A:
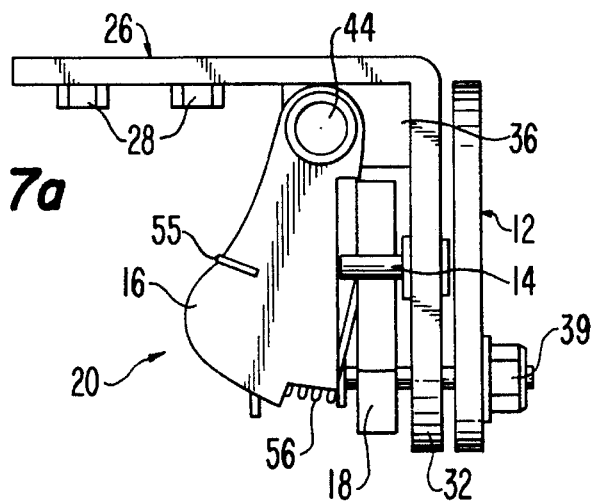
FIGS. 7a, 7b and 7c are an upper plan view, a front elevation view and a bottom plan view, respectively, of the right side load retaining add releasing mechanism shown in FIG. 1 in a third condition.
Figure 7B:
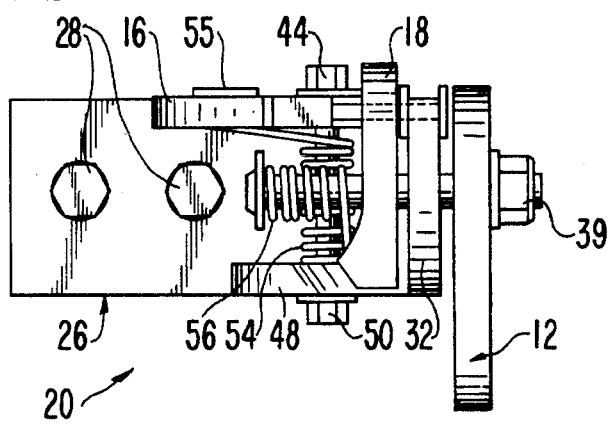
Figure 7C:
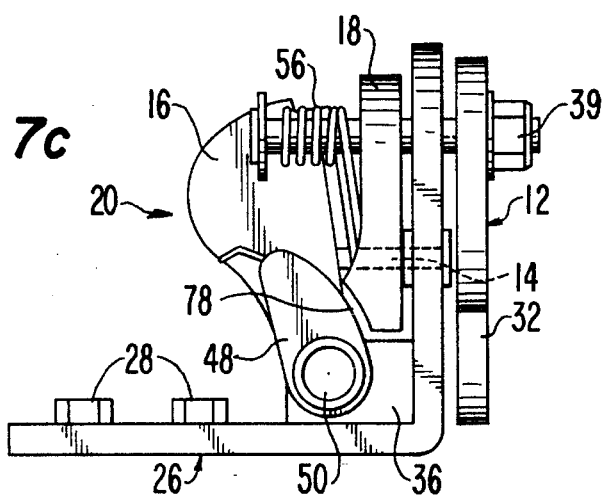

The stretcher 100 can then be pulled in the opposite direction (i.e. toward the rear of the vehicle) and the load engaging members 12 along with the pins 21 and first contact members 18 will move in the direction opposed to the arrows C in FIGS. 1 and 3 under the biasing action of the springs 56. Simultaneously, the cam-like surfaces 70 come out of contact with the curved surfaces 78 (as shown in FIG. 7c) and the movement limiting members 16 are biased by the springs 54 in the direction toward the first contact members 18 and lugs 32. As the surfaces 72 come out of contact with the movement limiting members 14, the cam-like surfaces 70 come out of contact with the curved surfaces 78. The springs 54 then bias the movement limiting members 16 back in the direction of the first contact members 18 and lugs 32 and movement limiting members 16 bear against the movement limiting members 14 which have been moved upwardly by the surfaces 72 of the first contact members 18. This position is seen best in FIGS. 7a, 7b and 7c. The movement limiting members 14 thus prevent the movement limiting members 16 from moving any closer to the first contact members 18 and lugs 32. The pins 21 along with the load engaging members 12 and the contact members 18 continue to move in the direction opposed to the arrows C under the biasing action of the springs 56 until the circumferential projecting portions 76 of the first contact member 18 come into contact with the movement limiting members 14 and push them downwardly in the curved slot apertures 34 such that they move out of engagement with the movement limiting members 16. The movement limiting members 14 are then forced to move downwardly in the curved slot apertures 34 until they reach the lower end thereof. When this occurs, the movement limiting members 14 prevent any further movement of the load engaging members 12 since the circumferential projecting portions 76 of the first contact members 18 abut with the movement limiting members 14. In this position, the load engaging members 12 have been returned to their initial position, i.e. the first position as shown in FIGS. 1 and 2 and FIGS. 5a, 5b and 5c. The stretcher 100 can then be pulled out of the ambulance and out of engagement with the load engaging members 12.

To facilitate engagement of the stretcher 100 with the load engaging members 12 and their movement to the second position, the load engaging members 12 are positioned at a downward angle. This is best seen in FIG. 1. This downward angle then enables the forward movement of the stretcher 100 to abut against the rear finger-like members 68 of the load engaging members and translates this into movement in the direction of the arrow C.

FIG. 8 shows a stretcher 100 in a retained position in the rear of an ambulance. A stabilizer device may be provided to engage with the rear frame portion 104 of the stretcher 100.

The stabilizer device may be of any suitable form. The stabilizer 110 shown in FIG. 8 comprises a movable bar 112 with a hook-like member 114 at one end thereof. By movement of a lever 116 from the position shown in phantom, the hook-like member 114 moves to engage with the frame portion 104 (as shown in solid lines) in a pulling type action. Release is effected by moving the lever 116 to its position shown in phantom which moves the hook-like member 114 to its position shown in phantom. A hinge arrangement 118 permits the lever 116 and movable bar assembly 112 to pivot downwardly onto the floor of the ambulance when the stabilizer 110 is disengaged.

In the above-described manner, the stretcher 100 can be securely retained in the rear of the ambulance vehicle. In this way, any rolling or other movement of the ambulance does not cause the stretcher 100 to move about in the rear of the ambulance vehicle.

Whilst the present invention has been described with particular reference to the load being a stretcher in an ambulance, the present invention is applicable to other loads in vehicles including mobile loads, e.g. trolleys, or other items on wheels or casters or without wheels or casters.

Modifications and variations such as would be apparent to a skilled artisan are deemed within the scope of the present invention.

I claim:

1. Apparatus for retaining a load in a vehicle, comprising:
    load engaging means movable in first and second directions and biased in said first direction, said load engaging means fixable in at least first and second positions, said load engaging means in said first position being arranged to receive said load and said load engaging means in said second position being arranged to retain said load;
    movement limiting means for said load engaging means; and
    first contact means to contact said movement limiting means, wherein said load engaging means is movable between said first and second positions and said contact means contacts said movement limiting means such that said load engaging means is fixable in said first and second positions;
    wherein said load engaging means is arranged to be moved from said first position to said second position in said second direction, and from said second position to a third position past said second position in said second direction so as to disengage said load engaging means from said second position and then from said third position to said first position in said first direction.

2. Apparatus for retaining a load according to claim 1, wherein said movement limiting means comprises first and second movement limiting means such that in said first position of said load engaging means, said first contact means contacts said first movement limiting means which prevents further movement of said load engaging means under said bias in said first direction to fix said load engaging means in said first position, and in said second position of said load engaging means, said first contact means contacts said second movement limiting means which prevents further movement of said load engaging means under said bias in said first direction to fix said load engaging means in said second position.

3. Apparatus for retaining a load according to claim 2, wherein said load engaging means and said first contact means are fixedly mounted on first pin means such that they rotate with said first pin means, and said second movement limiting means is fixedly mounted on second pin means such that it rotates with said second pin means.

4. Apparatus for retaining a load according to claim 1, wherein stabilizer means is provided to retain said load at a second location thereof, said stabilizer means having engagement means which is movable in and out of engagement with said load and stabilizes said load when in engagement therewith.

5. Apparatus for retaining a load according to claim 1, wherein said load engaging means comprises finger means having recess means therebetween which can receive said load.

6. Apparatus for retaining a load according to claim 2, wherein said first contact means has first and second parts which contact said first movement limiting means and said second movement limiting means, respectively, in said first and second positions, respectively, of said load engaging means.

7. Apparatus for retaining a load according to claim 2, wherein said second movement limiting means is biased in a third direction, and second contact means is provided to be contacted by said first contact means when said load engaging means moves from said second position to said third position to move said second movement limiting means against said bias of said second movement limiting means in a fourth direction.

8. Apparatus for retaining a load according to claim 2, wherein said load engaging means and said first contact means are fixedly mounted on first pin means such that they rotate with said first pin means, and said second movement limiting means is fixedly mounted on second pin means such that it rotates with said second pin means, and wherein said first and second pin means are rotatably held by bracket means and said first movement limiting means is movable in a slot-like aperture in said bracket means.

9. Apparatus for retaining a load according to claim 2, wherein said load engaging means and said first contact means are fixedly mounted on first pin means such that they rotate with said first pin means, and said second movement limiting means is fixedly mounted on second pin means such that it rotates with said second pin means, and wherein second contact means is fixedly mounted on said second pin means such that it rotates with said second pin means.

10. Apparatus for retaining a load according to claim 2, wherein said load engaging means and said first contact means are fixedly mounted on first pin means such that they rotate with said first pin means, and said second movement limiting means is fixedly mounted on second pin means such that it rotates with said second pin means, and wherein first spring means is provided on said first pin means to provide said bias of said load engaging means in said first direction and second spring means is provided on said second pin means to bias said second movement limiting means in a third direction.

11. Apparatus for retaining a load according to claim 2, wherein said load engaging means and said first contact means are fixedly mounted on first pin means such that they rotate with said first pin means, and said second movement limiting means is fixedly mounted on second pin means such that it rotates with said second pin means, and wherein said first and second pin means are rotatably held by bracket means and said first movement limiting means is movable in a slot-like aperture in said bracket means, and wherein said slot-like aperture is curved.

12. Apparatus for retaining a load according to claim 2, wherein said load engaging means and said first contact means are fixedly mounted on first pin means such that they rotate with said first pin means, and said second movement limiting means is fixedly mounted on second pin means such that it rotates with said second pin means, and wherein said first and second pin means are rotatably held by bracket means and said first movement limiting means is movable in a slot-like aperture in said bracket means, and wherein said bracket means is mounted on a support plate means which can be affixed to a vehicle.

13. Apparatus for retaining a load according to claim 2, wherein said load engaging means and said first contact means are fixedly mounted on first pin means such that they rotate with said first pin means, and said second movement limiting means is fixedly mounted on second pin means such that it rotates with said second pin means, and wherein said first and second pin means are rotatably held by bracket means and said first movement limiting means is movable in a slot-like aperture in said bracket means, and wherein first spring means contacts said first contact means such that said first contact means and thereby said first pin means and said load engaging means are urged in said first direction to thereby provide said bias in said first direction, and there is provided a second contact means fixedly mounted on said second pin means and a second spring means in which said second spring means contacts said second movement limiting means such that said second pin means and thereby said second contact means are biased in a third direction.

14. Apparatus for retaining a load in a vehicle, comprising:

load engaging means movable in first and second directions and biased in said first direction, said load engaging means fixable in at least first and second positions, said load engaging means in said first position being arranged to receive said load and said load engaging means in said second position being arranged to retain said load;

movement limiting means for said load engaging means; and first contact means to contact said movement limiting means, wherein said load engaging means is movable between said first and second positions and said contact means contacts said movement limiting means such that said load engaging means is fixable in said first and second positions;

wherein said load engaging means is movable from said first position to said second position in said second direction, and from said second position to a third position in said second direction past said second position in said second direction so as to disengage said load engaging means from said second position and then from said third position to said first position in said first direction, and said movement limiting means comprises first and second movement limiting means such that in said first position of said load engaging means, said first contact means contacts said first movement limiting means which prevents further movement of said load engaging means under said bias in said first direction to fix said load engaging means in said first position, and in said second position of said load engaging means, said first contact means contacts said second movement limiting means which prevents further movement of said load engaging means under said bias in said first direction to fix said load engaging means in said second position, and wherein said second movement limiting means is biased in a third direction, and second contact means is provided to be contacted by said first contact means when said load engaging means moves from said second position to said third position to move said second movement limiting means against said bias of said second movement limiting means in a fourth direction.

15. Apparatus for retaining a load in a vehicle, comprising:

load engaging means movable in first and second directions and biased in said first direction, said load engaging means fixable in at least first and second positions, said load engaging means in said first position being arranged to receive said load and said load engaging means in said second position being arranged to retain said load;

movement limiting means for said load engaging means; and first contact means to contact said movement limiting means, wherein said load engaging means is movable between said first and second positions and said contact means contacts said movement limiting means such that said load engaging means is fixable in said first and second positions;

wherein said movement limiting means comprises first and second movement limiting means such that in said first position of said load engaging means, said first contact means contacts said first movement limiting means which prevents further movement of said load engaging means under said bias in said first direction to fix said load engaging means in said first position, and in said second position of said load engaging means, said first contact means contacts said second movement limiting means which prevents further movement of said load engaging means under said bias in said first direction to fix said load engaging means in said second position, and said load engaging means and said first contact means are fixedly mounted on first pin means such that they rotate with said first pin means, and said second movement limiting means is fixedly mounted on second pin means such that it rotates with said second pin means; and wherein said first and second pin means are rotatably held by bracket means and said first movement limiting means is movable in a slot-like aperture in said bracket means.

16. Apparatus for retaining a load according to claim 15, wherein said slot-like aperture is curved.

17. Apparatus for retaining a load according to claim 15, wherein said bracket means is mounted on a support plate means which can be affixed to a vehicle.

* * * * *